United States Patent
Hanson et al.

(10) Patent No.: US 10,326,630 B2
(45) Date of Patent: *Jun. 18, 2019

(54) EXTRACTING SUB-BANDS FROM SIGNALS IN A FREQUENCY DOMAIN

(71) Applicant: CommScope Technologies LLC, Hickory, NC (US)

(72) Inventors: Van E. Hanson, Forest, VA (US); Christopher Goodman Ranson, Concord, VA (US); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,849

(22) Filed: Nov. 6, 2017

(65) Prior Publication Data
US 2018/0062900 A1 Mar. 1, 2018

Related U.S. Application Data

(63) Continuation of application No. 15/255,592, filed on Sep. 2, 2016, now Pat. No. 9,813,274, which is a
(Continued)

(51) Int. Cl.
*H04W 72/04* (2009.01)
*H04L 27/26* (2006.01)
(Continued)

(52) U.S. Cl.
CPC ......... *H04L 27/2627* (2013.01); *H04B 7/026* (2013.01); *H04L 5/0005* (2013.01); *H04W 72/0426* (2013.01)

(58) Field of Classification Search
CPC .. H04W 72/04; H04W 72/0429; H04L 27/26; H04L 5/0005
See application file for complete search history.

(56) References Cited

U.S. PATENT DOCUMENTS 7,376,130 B2 5/2008 Farmwald
7,463,576 B2 12/2008 Krishnan et al.
(Continued)

FOREIGN PATENT DOCUMENTS

KR 20080020078 A 3/2008
WO 2008144685 A1 11/2008

OTHER PUBLICATIONS

European Patent Office, "Communication Pursuant to 94(3) for EP Application No. 14784624.0", Foreign Counterpart to U.S. Appl. No. 14/255,739, Dated Mar. 5, 2018, pp. 1-4, Published in: EP.
(Continued)

*Primary Examiner* — Chi Ho A Lee
(74) *Attorney, Agent, or Firm* — Fogg & Powers LLC

(57) ABSTRACT

A unit includes circuitry configured to: receive a downlink signal; sub-divide the downlink signal into a sub-divided downlink signal having downlink signal components in a time domain, each downlink signal component corresponding to a respective sub-band; determine that at least one downlink signal component corresponds to at least one sub-band having data to be transmitted via a distributed antenna system; generate a transformed downlink signal representing the downlink signal in a frequency domain by performing a frequency transform on the downlink signal; determine that the at least one sub-band of the transformed downlink signal includes the data to be transmitted; extract the at least one sub-band from the transformed downlink signal at least in part by providing data for at least one portion of the transformed downlink signal in the frequency domain that corresponds to the at least one sub-band to the at least one remote antenna unit.

20 Claims, 4 Drawing Sheets

Related U.S. Application Data continuation of application No. 14/255,739, filed on Apr. 17, 2014, now Pat. No. 9,438,318.

(60) Provisional application No. 61/812,820, filed on Apr. 17, 2013.

(51) Int. Cl.
*H04B 7/026* (2017.01)
*H04L 5/00* (2006.01)

(56) References Cited

U.S. PATENT DOCUMENTS

| | | |
|---|---|---|
| 7,995,689 B2 | 8/2011 | Park et al. |
| 8,010,049 B2 | 8/2011 | Kawasaki |
| 8,023,599 B2 | 9/2011 | Tanaka et al. |
| 8,130,847 B2 | 3/2012 | Vook et al. |
| 8,494,073 B2 | 7/2013 | Wang et al. |
| 8,619,542 B2 | 12/2013 | Mondal et al. |
| 8,989,088 B2 | 3/2015 | Ling |
| 9,059,778 B2 | 6/2015 | Ling |
| 9,438,318 B2 | 9/2016 | Hanson et al. |
| 9,813,274 B2 | 11/2017 | Hanson et al. |
| 2003/0099282 A1 | 5/2003 | Magnusson |
| 2003/0099285 A1 | 5/2003 | Graziano et al. |
| 2004/0028003 A1 | 2/2004 | Diener et al. |
| 2004/0136314 A1 | 7/2004 | Jung et al. |
| 2004/0146072 A1 | 7/2004 | Farmwald |
| 2007/0232341 A1 | 10/2007 | Sakata |
| 2008/0189119 A1 | 8/2008 | Oh et al. |
| 2008/0267142 A1 | 10/2008 | Mushkin et al. |
| 2009/0111496 A1 | 4/2009 | Ibrahim et al. |
| 2009/0196249 A1 | 8/2009 | Kawamura et al. |
| 2009/0232087 A1 | 9/2009 | Chen et al. |
| 2009/0233646 A1 | 9/2009 | Cyzs et al. |
| 2010/0150013 A1 | 6/2010 | Hara et al. |
| 2010/0265874 A1 | 10/2010 | Palanki et al. |
| 2011/0222632 A1 | 9/2011 | Suzuki et al. |
| 2011/0281602 A1 | 11/2011 | Azimi-Sadjadi et al. |
| 2012/0051302 A1 | 3/2012 | Seki |
| 2012/0069807 A1 | 3/2012 | Meng et al. |
| 2012/0176966 A1 | 7/2012 | Ling |
| 2012/0250740 A1 | 10/2012 | Ling |
| 2012/0314797 A1 | 12/2012 | Kummetz et al. |
| 2012/0321314 A1 | 12/2012 | Oren et al. |
| 2013/0017863 A1 | 1/2013 | Kummetz et al. |
| 2013/0083705 A1 | 4/2013 | Ma et al. |
| 2013/0095870 A1 | 4/2013 | Phillips et al. |
| 2013/0117029 A1 | 5/2013 | Liu et al. |
| 2014/0050187 A1 | 2/2014 | Nakshima et al. |
| 2014/0119281 A1 | 5/2014 | Kummetz et al. |
| 2014/0219162 A1 | 8/2014 | Eyuboglu et al. |
| 2014/0219255 A1 | 8/2014 | Eyuboglu et al. |
| 2014/0219262 A1 | 8/2014 | Sun et al. |
| 2014/0219267 A1 | 8/2014 | Eyuboglu et al. |
| 2014/0253361 A1 | 9/2014 | Rezk et al. |

OTHER PUBLICATIONS

European Patent Office, "European Search Report for EP Application No. 14784624.0", "From foreign counterpart to U.S. Appl. No. 14/255,739", dated Oct. 25, 2016, pp. 1-9, Published in: EP.

International Search Authority, "International Search Report for PCT/US2014/034528", "From Foreign Counterpart to U.S. Appl. No. 14/255,739", dated Aug. 26, 2014, pp. 1-12, Published in: WO.

Mahapatra, "High Speed and Energy Efficient Hardware Architectures for LTE-Advanced Systems", A thesis submitted in partial fulfillment of the requirements for the Degree of Master of Applied Science, The University of British Columbia, Oct. 2013, pp. i-144, 133 Pages.

U.S., "Non-Final Office Action", "from U.S. Appl. No. 14/255,739", dated Sep. 3, 2015, pp. 1-12, Published in: US.

U.S., "Notice of Allowance", "From U.S. Appl. No. 14/255,739", dated May 6, 2016, pp. 1-10, Published in: US.

U.S., "Notice of Allowance", "from U.S. Appl. No. 14/255,739", dated Jan. 20, 2016, pp. 1-5, Published in: US.

United States Patent and Trademark Office, "Notice of Allowance for U.S. Appl. No. 15/255,592", dated Jul. 3, 2017, pp. 1-13, Published in: US.

United States Patent and Trademark Office, "Office Action for U.S. Appl. No. 15/255,592", dated Jan. 23, 2017, pp. 1-5, Published in: US.

International Bureau, "International Preliminary Report on Patentability from PCT Application No. PCT/US2014/034528 dated Oct. 20, 2015", from Foreign Counterpart to U.S. Appl. No. 14/255,739, Oct. 20, 2015, pp. 1-8, Published: Switzerland.

EXTRACTING SUB-BANDS FROM SIGNALS IN A FREQUENCY DOMAIN

CROSS-REFERENCE TO RELATED APPLICATIONS

This application is a continuation application of U.S. patent application Ser. No. 15/255,592 filed Sep. 2, 2016 and entitled "EXTRACTING SUB-BANDS FROM SIGNALS IN A FREQUENCY DOMAIN" (currently pending), which is a continuation application of U.S. patent application Ser. No. 14/255,739 filed Apr. 17, 2014 and entitled "EXTRACTING SUB-BANDS FROM SIGNALS IN A FREQUENCY DOMAIN" (issued as U.S. Pat. No. 9,438,318 on Sep. 6, 2016), which claims the benefit of U.S. Provisional Application Ser. No. 61/812,820 filed Apr. 17, 2013 and titled "Dividing Signals into Sub-Bands via Frequency Transforms," both of which are hereby incorporated by reference.

TECHNICAL FIELD

The present disclosure relates generally to telecommunications systems and more particularly (although not necessarily exclusively) to extracting sub-bands of interest from signals in a frequency domain.

BACKGROUND

A distributed antenna system ("DAS") can provide a signal transport network for communicating signals between one or more base stations and mobile communication devices or other terminal devices. The DAS may include master units and remote antenna units. The master units may be connected to the base stations. The master units receive downlink signals from the base stations and distribute downlink signals in analog or digital format to multiple remote antenna units. The remote antenna units transmit downlink signals to mobile communication devices or other terminal devices within coverage areas serviced by the remote antenna units. In the uplink direction, the remote antenna units receive uplink signals from terminal devices in the serviced coverage areas. The remote antenna units may combine uplink signals and transmit the combined uplink signals to master units. The master units may transmit uplink signals to the serving base stations.

A signal transport network provided by a DAS may be implemented using analog systems or digital systems. A digital system can include one or more devices for digitizing analog downlink signals received from a base station. A digital representation of the analog waveform is used to transmit the downlink signal via the DAS.

A master unit may route an entire downlink signal to remote antenna units of the DAS. Routing an entire downlink signal to remote antenna units can involve unnecessarily routing frequency bands in which no voice data or other data is transmitted.

It is desirable to distinguish sub-bands of signals communicated via a DAS that include voice or other data from sub-bands in which no voice data or other data is transmitted.

SUMMARY

Certain aspects and features of the present invention are directed to distributed antenna systems that can extract sub-bands of interest from signals in a frequency domain.

In one aspect, a method for extracting sub-bands of interest from signals in a frequency domain for transmission via a distributed antenna system is provided. The method involves generating a transformed downlink signal by performing a frequency transform on a downlink signal. The transformed downlink signal represents the downlink signal in a frequency domain. The method also involves determining that at least one sub-band of the transformed downlink signal includes data to be transmitted via the distributed antenna system. The method involves extracting the sub-band from the transformed downlink signal for transmission via the distributed antenna system.

In another aspect, a unit for extracting sub-bands of interest from signals in a frequency domain for transmission via a distributed antenna system is provided. The unit can include a first interface section, a processor, and a second interface section. The first interface section can receive a downlink signal from a base station. The processor can generate a transformed downlink signal by performing a frequency transform on a downlink signal. The transformed downlink signal represents the downlink signal in a frequency domain. The processor can also determine that at least one sub-band of the transformed downlink signal includes data to be transmitted via the distributed antenna system. The processor can also extract the sub-band from the transformed downlink signal. The second interface section can provide the extracted sub-band to at least one remote antenna unit of the distributed antenna system.

In another aspect, a distributed antenna system is provided. The distributed antenna system includes a unit and at least one remote antenna unit. The unit can receive a downlink signal and generate a transformed downlink signal by performing a frequency transform on the downlink signal. The transformed downlink signal represents the downlink signal in a frequency domain. The unit can also determine that at least one sub-band of the transformed downlink signal includes data to be transmitted via the distributed antenna system. The unit can also extract the at least one sub-band from the transformed downlink signal. The unit can also provide the extracted sub-band to the remote antenna unit. The remote antenna unit can generate a wireless RF signal based on the extracted sub-band and transmit the wireless RF signal to a terminal device.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
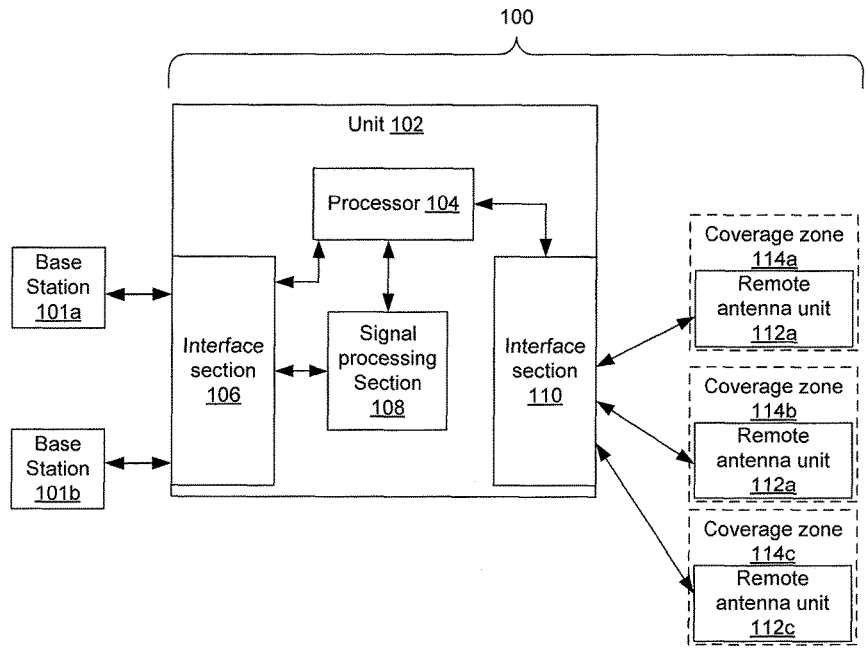
FIG. 1 is a block diagram depicting an example of a distributed antenna system in which sub-bands of interest can be extracted from signals in a frequency domain according to one aspect of the present disclosure.

Systems and methods are disclosed for dividing signals communicated via a distributed antenna system ("DAS") into equally spaced sub-bands using frequency transforms of the signals. In some aspects, a master unit or other unit of a DAS can transform a digital downlink signal from the time domain to the frequency domain. The unit of the DAS can identify multiple, equally sized sub-bands from the digital downlink signal in the frequency domain. Dividing signals communicated via the DAS into equally spaced sub-bands can thus reduce the amount of bandwidth used to route the signals to different units of the DAS. For example, data for frequency domain representations of individual sub-bands of interest can be processed and routed to remote antenna units in the DAS. Data for frequency domain representations of other sub-bands can be discarded or otherwise omitted from routing. Processing and routing individual sub-bands of interest can obviate the need to route the entire downlink signal via the DAS.

In some aspects, a unit of the DAS can include an input section, a processor, and an output section. The unit can receive downlink signals via the input section and output downlink signals via the output section to a remote antenna unit or other unit in the DAS. The processor of the unit can generate a transformed downlink signal by performing a frequency transform on the downlink signal or by configuring one or more signal processing devices to perform the frequency transform on the downlink signal. Performing a frequency transform on the downlink signal can include transforming the downlink signal from a time domain to a frequency domain. Non-limiting examples of a frequency transform can include a fast Fourier transform ("FFT"), a discrete Fourier transform, and a discrete cosine transform. The processor can determine that at least one sub-band of the transformed downlink signal includes voice or other data to be transmitted via the DAS. The processor can extract, identify, or otherwise selected the sub-bands from the transformed downlink signal that include the voice or other data to be transmitted. The output section can route the sub-bands having the data to one or more remote antenna units or other units of the DAS.

In a non-limiting example, a master unit or other unit of a DAS can receive signals from base stations and convert the downlink signals into digital downlink signals. The master unit can decompose or otherwise sub-divide the digital downlink signals into multiple, equally sized sub-bands. The master unit can extract or otherwise select sub-bands of interest from the equally sized sub-bands. Sub-bands of interest can include sub-bands in which voice data or other data is included. The master unit can provide sub-bands of interest to one or more remote antenna units. A remote antenna unit receiving the sub-bands of interest can convert the sub-band into a composite signal for transmission to mobile communication devices in a coverage area serviced by the remote antenna unit. In some aspects, a master unit can route different sub-bands extracted from a transformed downlink signal to different sets of remote antenna units.

Dividing signals communicated via a DAS into sub-bands can allow for separation of individual sub-bands of interest from composite signals communicated via the DAS. For example, in a time domain, a composite signal can be filtered to extract individual channels of interest, remove frequencies other than the channels of interest, or both. Transforming signals into a frequency domain representation of the signals can allow for removing the individual frequency components or otherwise manipulating the signals in a more computationally efficient manner as compared to filtering signals in the time domain. Also, each sub-band of a signal that has been divided can include digital signals sampled at the same sampling rate. Dividing signals that have been transformed into the frequency domain can provide greater computational efficiency than extracting channels of interest using the signals in the time domain.

In some aspects, the signal power for one or more sub-bands or groups of sub-bands extracted from a transformed downlink signal can be modified to increase or decrease the level of the signal in that sub-band. For example, the signal level of each sub-band or a group of sub-bands can be compared to a threshold value. The signal level of a sub-band can be scaled up or down based on whether the signal level is above or below the threshold.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram depicting an example of a DAS 100 in which sub-bands of interest can be extracted from signals in a frequency domain. The DAS 100 can communicate signals between one or more base stations 101a, 101b and mobile communication devices via master units and remote antenna units of the DAS 100. The DAS 100 can include a unit 102 and multiple remote antenna units 112a-c.

The unit can be a master unit or other suitable unit that can communicate with one or more base stations 101a, 101b. The unit 102 can receive downlink signals from the base stations 101a, 101b and transmit uplink signals to the base stations 101a, 101b. Any suitable communication link can be used for communication between the base stations 101a, 101b and a unit 102, such as (but not limited to) a wired connection or a wireless connection. A wired connection can include, for example, a connection via a copper cable, an optical fiber, or another suitable communication medium. A wireless connection can include, for example, a wireless RF communication link. The unit 102 can combine downlink signals received from base stations 101a, 101b. The unit 102 can transmit the combined downlink signals to one or more of the remote antenna units 112a-c.

The remote antenna units can provide signal coverage in respective coverage zones 114a-c. Providing signal coverage in the coverage zones 114a-c can include transmitting downlink signals received from the unit 102 to mobile communication devices or other terminal devices in the coverage zones 114a-c. Providing signal coverage in the coverage zones 114a-c can also include receiving uplink signals from the mobile communication devices or other terminal devices in the coverage zones 114a-c. The remote antenna units 112a-c can transmit the uplink signals to the unit 102. The unit 102 can combine uplink signals received from remote antenna units for transmission to the base stations 101a, 101b.

Although FIG. 1 depicts a direct connection between the unit 102 and the remote antenna units 112a-c, other implementations are possible. In some aspects, the unit 102 can be connected to the remote antenna units 112a-c via one or more extension units or other intermediate devices.

The unit 102 can include a processor 104, an interface section 106, a signal processing section 108, and an interface section 110. The interface section 106 can include one or more physical layer ("PHY") devices for communicating with base stations 101a, 101b. For example, the interface section 106 can include an external repeater, an internal RF transceiver included on an interface card, or other suitable RF interface device to communicate with the base stations 101a, 101b. The interface section 110 can include one or more PHY devices for communicating with remote antenna units or other units of a DAS 100. The signal processing section 108 can include one or more modules for conditioning, filtering, combining, or otherwise processing signals received via an interface section 106 and communicated to other devices in the DAS 100 via an interface section 110.

The processor 104 can include any processing device or group of processing devices configured to execute one or more algorithms for identifying sub-bands of interest. The processor 104 can configure the signal processing section 108 to sub-divide signals into equally spaced sub-bands. The processor 104 can configure the signal processing section 108 to extract or otherwise select sub-bands of interest from the equally spaced sub-bands. The processor 104 can include any device suitable for executing program instructions stored in a non-transitory computer-readable medium or other memory device to control operation of the unit 102. Examples of processor 104 include a microprocessor, an application-specific integrated circuit ("ASIC"), a field-programmable gate array ("FPGA"), or other suitable processor.

Figure 2:
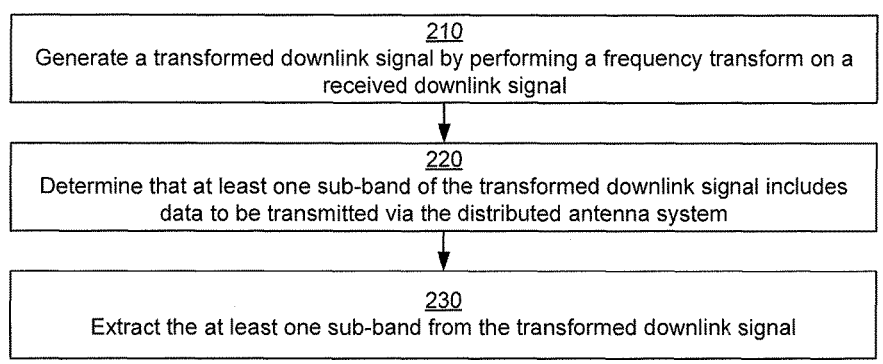
FIG. 2 is a flow chart depicting an example of a process for extracting sub-bands of interest from a downlink signal in the frequency domain according to one aspect of the present disclosure.

The unit 102 can extract or otherwise identify sub-bands of interest from a downlink signal in the frequency domain. FIG. 2 is a flow chart depicting an example of a process for extracting sub-bands of interest from a downlink signal in the frequency domain.

In block 210, the unit 102 generates a transformed downlink signal by performing a frequency transform on a downlink signal received from a base station. One or both of the processor 104 and the signal processing section 108 can execute computationally efficient algorithms for generating the transformed downlink signal and for determining the equally spaced sub-bands into which downlink signals can be divided.

In a non-limiting example, an FFT can be applied to a downlink signal to convert the downlink signal from the time domain to the frequency domain. One or more FFT modules or modules in the signal processing section 108 of the unit can generate an FFT for a frequency spectrum used by the DAS 100. Each bin of the FFT can correspond to a sub-band of the downlink signal. Each bin can include information about the downlink signal within the bandwidth of the bin, such as a magnitude and a phase for the sub-band in the bin. A length of the FFT being used can determine the bandwidth for each sub-band. For example, the processor 104 can obtain a 1,024-point FFT of a signal received by the unit. The sampling rate of the digital signal can be divided into the 1,024 FFT bins. The processor 104 can identify sub-bands of interest within the frequency spectrum from the FFT of the frequency spectrum. The unit 102 can use the processor 104 to extract the identified sub-bands for processing and routing.

In block 220, the processor 104 determines that at least one sub-band of the transformed downlink signal includes data to be transmitted via the DAS 100. The processor 104 can identify that the transformed downlink signal includes sub-bands of interest. For example, the processor 104 can determine that one or more bins of an FFT or other frequency transform include data having a magnitude exceeding a threshold magnitude.

In some aspects, the processor 104 can analyze the downlink signal in the time domain to determine if a signal of interest is present. The processor 104 can calculate or otherwise determine which FFT bins include the signal of interest.

In additional or alternative aspects, the processor 104 can identify sub-bands of interest by examining the downlink signal in both the time and frequency domain. The processor 104 can detect signal characteristics consistent with mobile wireless signals. For example, the processor 104 can detect a particular modulation format and thereby identify signals of interest.

In additional or alternative aspects, the processor 104 can be configured by a user to extract specific spectral segments. The processor 104 can determine the FFT bins corresponding to the configured spectral segments.

In additional or alternative aspects, the processor 104 can communicate with the base station 101a, 101b to determine which channels are used by the base stations 101a, 101b. The processor 104 can identify the FFT bins that include the signals of interest based on which channels are used by the base stations 101a, 101b. For example, the base stations 101a, 101b may transmit control signals that are addressed to the unit 102 and that identify the channels being used. In some aspects, the control signals can be transmitted via the same communication links as downlink signals that are to be communicated to terminal devices. In other aspects, the control signals can be transmitted via a dedicated communication link that is different from communication links used to transmit downlink signals to the DAS 100. The unit 102 can include an interface card or other device used to communicate with one or more of the base stations 101a, 101b via the dedicated communication link.

In block 230, the unit 102 extracts the at least one sub-band from the transformed downlink signal. In some aspects, the processor 104 can extract or otherwise select the sub-bands of interest by selecting FFT bins corresponding to the sub-bands of interest. Each bin can represent a given amount of frequency spectrum. The unit 102 can transmit bins corresponding to the sub-bands of interest to one or more other remote antenna units 112a-c. In a non-limiting example, a portion of the downlink frequency band may lack any voice data or other data to be transmitted. The unit 102 can remove sub-bands from the downlink signal that correspond to the portion of the frequency band without voice or data. Removing the sub-bands can reduce the occupied bandwidth on the transport media between the unit 102 and the remote antenna units 112a-c.

In some aspects, selecting the bins of interest can cause one or more discontinuities in the frequency domain that may result in distortion in the time domain. Distortion can be minimized by filtering the sub-bands of interest from the frequency spectrum used by the DAS 100. For example, the unit 102 can select bins corresponding to the sub-bands of interest by applying a windowing function to an FFT of the frequency spectrum to minimize distortion in the time domain.

Extracting sub-bands of interest can differ from filtering a signal in the time domain. Filtering signals may involve decimating the signal to reduce the sampling rate of the original signal in order to reduce the amount of bandwidth required to transport a digital version of the signal. A receiving device may interpolate or otherwise up-sample the received signal. In the time domain, each sub-band may be down-converted via a mixer and decimated in a low-pass filtering operation. To combine multiple sub-bands at an up-converter may involve tracking the phases of the down-converter and the up-converter. Tracking the phases of the down-converter and the up-converter can involve identifying the delays between the down-conversion process for de-composing or otherwise dividing the sub-band and the up-conversion process for reconstructing the signal at a receiving device. Subdividing signal in the frequency domain can obviate the need to track the phases of down-conversion and up-conversion processes. A phase relationship from bin to bin can be identified by the process of transforming the signal into the frequency domain.

In additional or alternative aspects, a filter can be applied to a signal in the time domain to sub-divide the signal into the sub-bands prior to converting the signal to the frequency domain. For example, the unit 102 can include a filter bank or a set of discrete filters in the signal processing section 108 prior to an FFT module or other frequency transform module. The filter bank or a set of discrete filters can be used to sub-divide a downlink signal (either in analog or digital format) into multiple downlink signal components in the time domain. Each of the signal components can correspond to one of the sub-bands. The downlink signal components outputted by the filter bank or other set of filters can be transformed into the frequency domain using the FFT module or other frequency transform module. The bins of the frequency domain representation that correspond to sub-bands of interest can be selected by the unit 102 and communicated via the DAS 100.

In additional or alternative aspects, using frequency transforms to divide downlink signals into sub-bands can allow the unit 102 to modify a signal level in some portions of the downlink frequency band relative to signal levels in other portions of the downlink frequency band. For example, the unit 102 can modify a signal level for a portion of the downlink frequency band by multiplying sub-bands within the portion of the downlink frequency band by an appropriate scaling factor. Multiplying sub-bands within the portion of the downlink frequency band by the appropriate scaling factor can allow for simplified equalization of signal levels from different signal sources.

In additional or alternative aspects, dividing downlink signals into sub-bands can allow for flexible routing and combining of signals from multiple base stations 101a, 101b to different groups of remote antenna units. Dividing downlink signals into smaller sub-bands allows for flexible routing of signals by identifying channels of interest or sub-bands of interest and focusing signal processing to those channels of interest or sub-bands of interest.

In one non-limiting example, the unit 102 can determine that one or more sub-bands of a digital downlink lack data to be transmitted via the DAS 100. For instance, the processor 104 of the unit 102 can identify one or more bins of the frequency domain representation of the downlink signal (e.g., an FFT, a discrete Fourier transform, a discrete cosine transform, etc.) that have signal level values that are less than a desired threshold. A signal level can include, for example, a signal power, a voltage, a magnitude, a variance, or any other signal parameter that is suitable for determining whether a signal is present. The unit 102 can discard data from the identified bins or otherwise modify the frequency domain representation of the downlink signal to exclude the sub-bands associated with the identified bins. The unit 102 can reduce the sampling rate of the modified digital downlink signal based on the sub-bands without data being excluded from the digital downlink signal.

In another non-limiting example, a unit 102 may receive downlink signals from three base stations that transmit downlink in a common frequency band. A first base station and a second base station may transmit downlink signals using the same frequencies with the frequency band. The unit 102 can route downlink signals from the first and second base stations to non-intersecting subsets of the remote antenna units 112a-c. For example, the unit 102 can route downlink signals from the first base station to one or more remote antenna units 112a in the coverage zone 114a and can route downlink signals from the second base station to one or more remote antenna units 112b in the coverage zone 114b. The third base station may transmit downlink signals using frequencies with the frequency band that are different from the frequencies used by the first and second base stations. For example, the third base station may operate in frequencies that do not overlap the frequencies used by the first and second base stations. Downlink signals from the first base station and the third base station can be combined and sent to a subset of the remote antenna units 112a-c for transmission. Downlink signals from the second base station and the third base station can be combined and sent to a different subset of the remote antenna units 112a-c for transmission. For example, the unit 102 can route downlink signals from the first and third base stations to one or more remote antenna units 112a in the coverage zone 114a and can route downlink signals from the second and third base stations to one or more remote antenna units 112b in the coverage zone 114b.

Downlink signals from base stations 101a, 101b can each be sampled at a rate that allows the downlink signals from the base stations 101a, 101b to be represented in a combined signal sum. For instance, in the example provided above, a unit 102 may receive downlink signals from three base stations that transmit downlink in a common frequency band. Downlink signals from the first base station and the second base station may be converted to a digital signal with a sampling rate of X samples/second. Downlink signals from the third base station may be converted to a digital signal with a sampling rate of Y samples/second. Routing downlink signals from the three base stations to the remote antenna units 112a-c may involve sampling the downlink signals received from the base stations at a sampling rate of at least X+Y samples/second. Communication links between the unit 102 and the remote antenna units 112a-c may require a total bandwidth of 3×(X+Y) for routing the downlink signals from the three base stations to the remote antenna units 112a-c.

The bandwidth requirements for the DAS 100 described in the example above can be reduced by identifying sub-bands of interest for the downlink signals received from the three base stations. For example, the unit 102 can combine a first set of downlink signals from the first base station and the third base station and can route the combined downlink signals to a first subset of the remote antenna units 112a-c. The unit 102 can convert downlink signals from the first and third base stations into digital downlink signals using a sampling rate of 2×(X+Y) and can transmit the digital downlink signals to the first subset of remote antenna units 112a over one or more communication links having a bandwidth of 2×(X+Y). The unit 102 can also combine a second set of downlink signals from the second base station and the third base station and route the combined downlink signals to a second subset of the remote antenna units 112a-c. The unit 102 can also convert the downlink signals received from the second and third base stations into digital downlink signals using a sampling rate of 2×(X+Y) and can transmit the digital downlink signals to the second subset of remote antenna units 112a over one or more communication links having a bandwidth of 2×(X+Y). Sub-dividing downlink signals into sub-bands can thus provide more efficient use of resources in the DAS 100.

Figure 3:
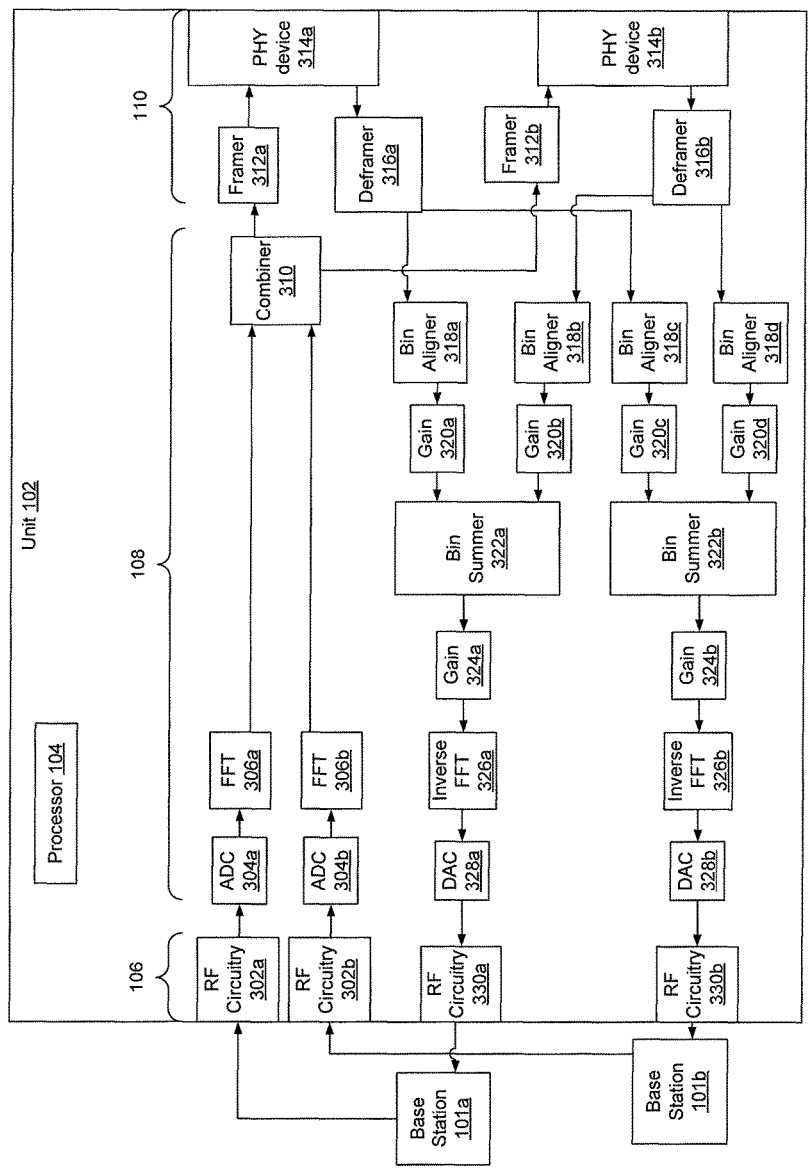
FIG. 3 is a block diagram depicting an example of a unit of a distributed antenna system that can sub-divide downlink signals into sub-bands in the frequency domain according to one aspect of the present disclosure.

FIG. 3 is a block diagram depicting an example of a unit 102 that can sub-divide downlink signals into sub-bands in the frequency domain. The unit 102 can include the processor 104, which is configured to communicate with signal processing devices in the signal processing section 108. In a downlink direction, the unit 102 can include RF circuitry 302a, 302b, analog-to-digital converters 304a, 304b, FFT modules 306a, 306b, a combiner 310, framers 312a, 312b, and PHY devices 314a, 314b. In some aspects, one or more of the FFT modules 306a, 306b, the combiner 310, and the framers 312a, 312b can be implemented as software modules executed by the processor 104. In additional or alternative aspects, one or more of the FFT modules 306a, 306b, the combiner 310, and the framers 312a, 312b can be implemented using dedicated signal processing circuitry, such as an FPGA. Although FIG. 3 depicts two downlink paths for illustrative purposes, any number of downlink paths can be implemented in the unit 102.

As depicted in FIG. 3, the interface section 106 can include the RF circuitry 302a, 302b that is configured for receiving downlink signals from the base stations 101a, 101b. Non-limiting examples such RF circuitry include a wireless RF transceiver, an interface card for receiving RF signals over coaxial cable or another wired connection, etc.

The signal processing section 108 can include the analog-to-digital converters 304a, 304b, the FFT modules 306a, 306b, and the combiner 310. The analog-to-digital converters 304a, 304b of the unit 102 can convert analog downlink signals received by the unit 102 to digital downlink signals. The FFT modules 306a, 306b can transform the digital downlink signals into the frequency domain. The processor 104 of the unit 102 can extract or otherwise select sub-bands of interest from the downlink signals in the frequency domain. The processor 104 can be communicatively coupled to some or all of the signal processing devices of the unit 102 via any suitable structure for transporting electrical signals between devices or components within the unit 104. For example, the processor 104 can communicate with the signal processing devices of the unit 102 via, for example, a printed circuit board (not depicted) or other conductive components that can be used to communicate electrical signals within the unit 102. In some aspects, the processor 104 can provide a control signal to the combiner 310 to ignore data in the frequency domain received from one or more of the FFT modules 306a, 306b other than the data in the frequency domain corresponding to the sub-bands of interest from the FFT module. In additional or alternative aspects, the processor 104 can configure one or more of the FFT modules 306a, 306b to only send bins corresponding to the sub-bands of interest to the combiner 310. In additional or alternative aspects, the processor 104 can configure one or more of the combiner 310 or one or more of the framers 312a, 312b to only send bins corresponding to the sub-bands of interest to other devices or modules in the downlink path. The combiner 310 can combine the extracted sub-bands of interest from the downlink paths of the unit 102 into serialized downlink data for transmission to remote antenna units.

Although FIG. 3 depicts FFT modules 306a, 306b for performing frequency transforms, any suitable frequency transform device or module can be used in the downlink direction.

The interface section 110 can include the framers 312a, 312b and the PHY devices 314a, 314b. The framers 312a, 312b can packetize serialized downlink data received from the combiner 310 for transmission to one or more of the remote antenna units 112a-c as a packetized data stream. The PHY devices 314a, 314b can transmit the packetized downlink data streams to the remote antenna units 112a-c.

In an uplink direction, the unit 102 can include the PHY devices 314a, 314b, deframers 316a, 316b, bin aligners 318a-d, gain adjustment modules 320a-d, bin summers 322a, 322b, gain adjustment modules 324a, 324b, inverse FFT modules 326a, 326b, digital-to-analog converters 328a, 328b, and RF circuitry 330a, 330b. In some aspects, one or more of the deframers 316a, 316b, the bin aligners 318a-d, the gain adjustment modules 320a-d, the bin summers 322a, 322b, the gain adjustment modules 324a, 324b, and the inverse FFT modules 326a, 326b can be implemented as software modules executed by the processor 104. In additional or alternative aspects, one or more of the deframers 316a, 316b, the bin aligners 318a-d, the gain adjustment modules 320a-d, the bin summers 322a, 322b, the gain adjustment modules 324a, 324b, and the inverse FFT modules 326a, 326b can be implemented using dedicated signal processing circuitry, such as an FPGA. Although FIG. 3 depicts two uplink paths for illustrative purposes, any number of uplink paths can be implemented in the unit 102.

In an uplink direction, the interface section 110 for communicating with the remote antenna units 112a-c can include the PHY devices 314a, 314b and the deframers 316a, 316b. The PHY devices 314a, 314b can receive packetized uplink data streams from one or more of the remote antenna units 112a-c. The de-framers 316a, 316b can extract uplink data from packetized uplink data streams received from remote antenna units 112a-c.

The signal processing section 108 can also include the bin aligners 318a-d, the gain adjustment modules 320a-d, the bin summers 322a, 322b, the gain adjustment modules 324a, 324b, the inverse FFT modules 326a, 326b, and the digital-to-analog converters 328a, 328b. Each of the bin aligners 318a-d can align frequency bins from FFTs or other frequency transforms of uplink signals. For example, FFT data for the same uplink signals that are received by the unit 102 from different remote antenna units 112a-c may be shifted in time with respect to one another. Each of the bin aligners 318a-d can be used to account for the FFT data being shifted in time by ensuring that the same frequency bins of FFT data from different remote antenna units 112a-c are added together in bin summers 322a, 322b. Although FIG. 3 depicts two bin aligners 318a, 318b for providing uplink signals to the bin summer 322a and two bin aligners 318c, 318d for providing uplink signals to the bin summer 322b, any number of bin aligners can be used to align bins that are to be summed at a bin summer. Each of the bin aligners 318a-d can provide an uplink signal to a respective one of the gain adjustment modules 320a-d. Each of the gain adjustment modules 320a-d can adjust the gain of the uplink signal outputted from a respective one of the bin aligners 318a-d.

Each of the bin summers 322a, 322b can sum or otherwise combine frequency bins from uplink signals in the frequency domain (e.g., OFDM uplink signals). Each of the bin summers 322a, 322b can add the same frequency bins of FFTs from multiple remote antenna units. For example, three FFTs may be obtained from three remote antenna units, where each FFT includes 1,024 bins. A bin summer can add the first bin from the three FFTs and can save the sum in the first bin of the FFT sum. The bin summer can add the second bin from the three FFTs and can save the sum in the second bin of the FFT sum. The bin summer can repeat the process until all bin values for each of the 1,024 bins of the FFT are added.

The inverse FFT modules 326a, 326b can transform FFTs of uplink signals into the time domain for transmission to the base stations 101a, 101b. Although FIG. 3 depicts inverse FFT modules 326a, 326b for transforming FFTs into the time domain, the unit 102 can include any suitable inverse frequency transform device for transforming frequency domain representations of signals into the time domain. The digital-to-analog converters 328a, 328b can convert digital uplink signals in the time domain to analog uplink signals for transmission to base stations 101a, 101b via the RF circuitry 330a, 330b included in the interface section 106.

Figure 4:
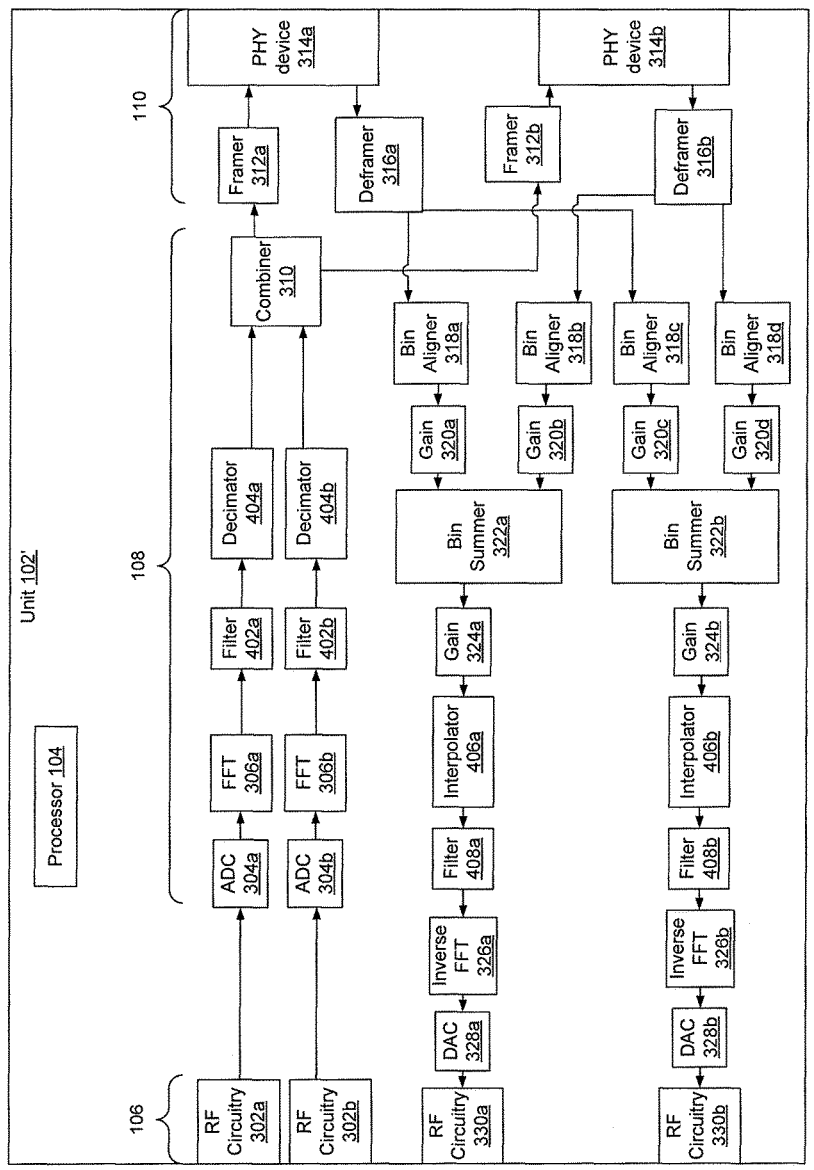
FIG. 4 is a block diagram depicting an alternative example of a unit of a distributed antenna system that can sub-divide downlink signals into sub-bands in the frequency domain according to one aspect of the present disclosure.

FIG. 4 is a block diagram depicting an alternative example of a unit 102' that can sub-divide downlink signals into sub-bands in the frequency domain. The unit 102' can include downlink filters 402a, 402b and decimators 404a, 404b in the downlink paths. The analog-to-digital converters 304a, 304b may sample the downlink signals received from the base stations 101a, 101b at a higher rate than is desirable for representing the signals that occupy the bandwidth of the input RF signal. The decimators 404a, 404b can be used to reduce the sampling rate of the digital downlink signal to a rate at or near the minimum used to represent the downlink signals (e.g., the Nyquist rate). Reducing the sampling rate of the digital downlink signal can conserve transmission resources, such as the available bandwidth of communication links between the unit 102 and the remote antenna units 112a-c. A frequency domain decimation function can be provided to reduce the sampling rate.

Each of the downlink filters 402a, 402b can be a low-pass filter that can filter the transformed downlink signal outputted from a respective one of the FFT modules 306a, 306b. Filtering the transformed downlink signals can prevent or reduce aliasing caused by the decimators 404a, 404b. The downlink filters 402a, 402b can also attenuate signals in frequency bins from the FFT that are not of interest. Attenuating the signals that are not of interest using the downlink filters 402a, 402b can allow the decimators 404a, 404b to reduce aliasing to an acceptable level by removing the attenuated frequency bins from the FFT representations of the downlink signals. Each of the decimators 404a, 404b can reduce the sampling rate of downlink signals by removing the frequency bins that have been attenuated.

The unit 102 depicted in FIG. 4 can also include interpolators 406a, 406b and uplink filters 408a, 408b in the uplink paths. Each of the interpolators 406a, 406b can increase the sampling rate of a respective uplink signal outputted from a respective one of the gain adjustment modules 324a, 324b. Each of the uplink filters 408a, 408b can filter the signal outputted from a respective one of the interpolators 406a, 406b to prevent or reduce aliasing caused by the interpolators 406a, 406b.

In additional or alternative aspects, frequency transforms of uplink signals can be used to reduce the bandwidth requirements for communicating the uplink signals via the DAS 100. For example, the unit 102 can combine uplink signals received by multiple remote antenna units 112a-c into a combined uplink signal for transmission to one or more of the base stations 101a, 101b. The unit 102 can add or otherwise combine individual sub-bands of uplink signals from different remote antenna units 112a-c. The unit 102 can exclude other sub-bands of the uplink signals from the combined uplink signal. For example, a given sub-band or group of sub-bands from one remote antenna unit may be unexcited. An unexcited sub-band can include a sub-band in which only noise without any signal component is received at a remote antenna unit. Unexcited sub-bands may be excluded from a combination of sub-bands in the same frequency range received from other remote antenna units (e.g., a squelch operation). In some aspects, sub-bands of interest can be identified and extracted by a processor 104 of a unit 102 receiving uplink signals from remote antenna units. In other aspects, sub-bands of interest can be identified and extracted by a processor of a remote antenna unit.

Figure 5:
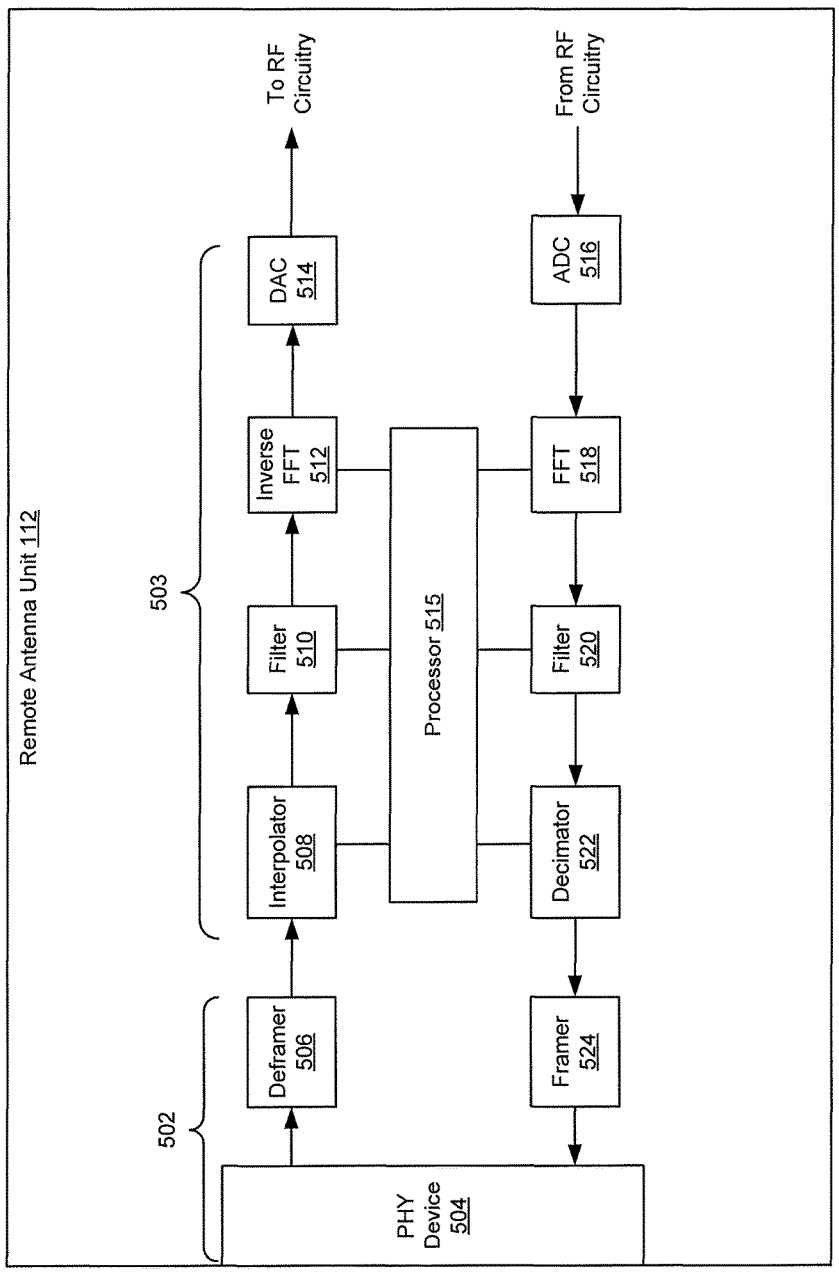
FIG. 5 is a block diagram depicting an example of a remote antenna unit of a distributed antenna system that can sub-divide uplink signals into sub-bands in the frequency domain.

FIG. 5 is a block diagram depicting an example of a remote antenna unit 112 that can sub-divide uplink signals into sub-bands in the frequency domain. The remote antenna unit 112 can include an interface section 502 and a signal processing section 503. The interface section 502 can include a PHY device 504, a deframer 506, and a framer 522. The signal processing section 503 can include an interpolator 508, a low-pass filter 510, an inverse FFT module 512, a digital-to-analog converter 514, a processor 515, an analog-to-digital converter 516, an FFT module 518, a filter 520, and a decimator 524.

In a downlink path, the PHY device 504 can receive packetized downlink data streams from the unit 102. The deframer 506 can extract downlink data from the packetized downlink data streams. The interpolator 508 can increase the sampling rate of a digital downlink signal received from the deframer 506. The filter 510 can be a low-pass filter or other filter that is suitable for preventing or reducing aliasing caused by the interpolator 508. The inverse FFT module 512 or other suitable inverse frequency transform device can transform digital downlink signals from the frequency domain into the time domain. The digital-to-analog converter 514 can convert the digital downlink signals to analog downlink signals for transmission to mobile communication devices or other terminal devices via suitable RF circuitry.

In an uplink path, the analog-to-digital converter 516 can convert analog uplink signals to digital uplink signals. The analog uplink signals can be received using suitable RF circuitry of the remote antenna unit 112. An FFT module 518 or other frequency transform device can transform the digital uplink signals into the frequency domain. The processor 515 can extract or otherwise select sub-bands of interest from the uplink signal in the frequency domain. The processor 515 can include any device suitable for executing program instructions stored in a non-transitory computer-readable medium or other memory device to control operation of the remote antenna unit 112. Examples of processor 515 include a microprocessor, an ASIC, an FPGA, or other suitable processor.

The filter 520 can be a low-pass filter or other filter that is suitable for preventing or reducing aliasing caused by the decimator 524. The decimator 524 can decrease the sampling rate of the digital uplink signal for transmission via the DAS 100. The framer 522 can packetize uplink data received from mobile communication devices for transmission to the unit 102. The PHY device 504 can transmit packetized uplink data streams to the unit 102.

In some aspects, one or more of the elements in the signal processing section 503 can be implemented as software modules executed by the processor 104. In additional or alternative aspects, one or more of the elements in the signal processing section 503 can be implemented using dedicated signal processing circuitry, such as an FPGA. Although FIG.

5 depicts the downlink path as including an interpolator 508 and a low-pass filter 510, other implementations are possible. In some aspects, the interpolator 508 and the low-pass filter 510 can be omitted. Although FIG. 5 depicts the uplink path as including the 520 and the decimator 524, other implementations are possible. In some aspects, the filter 520 and the decimator 524 can be omitted.

In some aspects, a DAS 100 can be used to communicate orthogonal frequency-division multiplexing ("OFDM") signals. Some telecommunication technologies, such as OFDM-based signals transmitted via long-term evolution ("LTE") systems, use FFTs and inverse FFTs for processing signals that are communicated with mobile communication devices or other terminal devices. These types of signals can be sub-divided into sub-bands using an FFT. Each FFT can be aligned with a complete OFDM symbol.

For example, LTE signals can include multiple resource blocks. Each resource block may have a size of one FFT bin. Each FFT bin can be encoded via quadrature amplitude modulation ("QAM") to convey information. A sub-banding unit of a DAS 100 can decompose an LTE signal into FFT bins. Unused resource blocks may not be transmitted from the master unit to the remote antenna unit. A guard time (called the cyclic prefix) used between LTE symbols may not convey information. The guard time or cyclic prefix may not be transmitted from the master unit to the remote antenna unit. Excluding un-used resource blocks or guard times from signals communicated via a DAS 100 can reduce the bandwidth used to communicate the signals.

OFDM signals can be communicated in an FFT format. If a known OFDM-based signal uses an FFT format, the unit 102 can synchronize the start and stop of FFT frames to correspond with the start and stop of the OFDM-based symbols to be transported. Synchronizing the start and stop of FFT frames to correspond with the start and stop of the OFDM-based symbols can include analyzing the OFDM signal with a measurement module implemented in the processor 104 of the unit 102. The measurement module can determine the timing of the received signal. The timing of the signal can be used to control when to start and stop FFT frames.

In additional or alternative aspects, the unit 102 of the DAS 100 can equalize a frequency response throughout the DAS 100. Some analog circuitry for devices in a DAS 100 can have a frequency response that is not as constant (or "flat") as desirable. A desirable frequency response can have a magnitude and group delay that is constant across the frequency spectrum used by the DAS 100. Imperfections in analog circuitry can introduce ripples and other imperfections across the frequency spectrum. The unit 102 can execute one or more operations in the frequency domain to apply the inverse of the frequency response of the analog circuitry. Applying the inverse of the frequency response can include applying different complex weightings to different bins corresponding to frequencies of interest to compensate for variance of magnitude and/or group delay across the frequency spectrum used by the DAS 100. Applying the inverse of the frequency response can equalize the frequency response throughout the DAS 100.

In some aspects, a magnitude (i.e., weight) associated with each bin of interest can be modified by the processor applying a multiplier to the bin. In other aspects, a complex weight can be applied to the bins of interest. A complex weight can be used to modify the gain and phase of a bin by performing a complex multiplication of the bin and the complex weight.

The foregoing description of aspects and features of the disclosure, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each disclosed example can be combined with any other example. The illustrative examples described above are given to introduce the reader to the general subject matter discussed here and are not intended to limit the scope of the disclosed concepts.

What is claimed is:

1. A unit comprising:
   circuitry configured to:
   receive a downlink signal;
   sub-divide the downlink signal into a sub-divided downlink signal having downlink signal components in a time domain, each of the downlink signal components corresponding to a respective sub-band;
   determine that at least one downlink signal component of the downlink signal components corresponds to at least one sub-band having data to be transmitted via a distributed antenna system;
   generate a transformed downlink signal representing the downlink signal in a frequency domain by performing a frequency transform on the downlink signal;
   determine that the at least one sub-band of the transformed downlink signal includes the data to be transmitted;
   extract the at least one sub-band from the transformed downlink signal at least in part by being configured to provide data for at least one portion of the transformed downlink signal in the frequency domain that corresponds to the at least one sub-band to the at least one remote antenna unit of the distributed antenna system.

2. The unit of claim 1, the circuitry configured to:
   provide the frequency transform by executing at least one of a fast Fourier transform algorithm, a discrete Fourier transform algorithm, and a discrete cosine transform algorithm using the downlink signal as an input.

3. The unit of claim 1, wherein the circuitry is configured to determine that the at least one sub-band of the transformed downlink signal includes the data to be transmitted by being configured to:
   identify, for each of a plurality of portions of the transformed downlink signal in the frequency domain, a respective signal level for the portion; and
   determine that at least one of the plurality of portions that corresponds to the at least one sub-band has a signal level exceeding a threshold signal level.

4. The unit of claim 1, wherein the circuitry is configured to determine that the at least one sub-band of the transformed downlink signal includes the data to be transmitted by being configured to:
   receive a control signal from a base station;
   identify, from the control signal, at least one channel used by the base station to transmit downlink signals; and
   identify the at least one sub-band from the at least one identified channel.

5. The unit of claim 1, wherein the circuitry is configured to discard the additional data for the at least one additional portion by being configured to:
   provide a control signal to a combiner module of the unit, wherein the control signal is configured to cause the combiner module to exclude the additional data from a combining operation used to route the data for the at least one portion to the at least one remote antenna unit.

6. The unit of claim 1, wherein the circuitry is further configured to:
determine that at least one additional sub-band lacks data to be transmitted via the distributed antenna system;
modify the transformed downlink signal to exclude the at least one additional sub-band; and
reduce a sampling rate of the transformed downlink signal based on the transformed downlink signal being modified to exclude the at least one additional sub-band.

7. The unit of claim 1, wherein the circuitry is further configured to:
receive a plurality of frequency-transformed uplink signals from a plurality of remote antenna units of the distributed antenna system;
identify a subset of sub-bands from the plurality of transformed uplink signals that include uplink data to be transmitted via the distributed antenna system; and
combine the subset of sub-bands for transmission to the base station and excluding sub-bands other than the subset of sub-bands that include the uplink data.

8. The unit of claim 1, wherein the at least one portion of the transformed downlink signal includes at least one bin.

9. A method comprising:
sub-dividing a downlink signal into a sub-divided downlink signal having downlink signal components in a time domain, each of the downlink signal components corresponding to a respective sub-band;
determining that at least one component of the plurality of downlink signal components corresponds to at least one sub-band having data to be transmitted via a distributed antenna system;
generating a transformed downlink signal representing the downlink signal in a frequency domain by performing a frequency transform on the downlink signal;
determining that the at least one sub-band of the transformed downlink signal includes the data to be transmitted;
extracting the at least one sub-band from the transformed downlink signal at least in part by providing data for at least a portion of the transformed downlink signal in the frequency domain that corresponds to the at least one sub-band to at least one remote antenna unit of the distributed antenna system.

10. The method of claim 9, wherein performing the frequency transform comprises executing at least one of a fast Fourier transform algorithm, a discrete Fourier transform algorithm, and a discrete cosine transform algorithm using the downlink signal as an input.

11. The method of claim 9, wherein determining that the at least one sub-band of the transformed downlink signal includes the data to be transmitted comprises:
identifying, for each of a plurality of portions of the transformed downlink signal in the frequency domain, a respective signal level for the portion; and
determining that at least one of the plurality of portions that corresponds to the at least one sub-band has a signal level exceeding a threshold signal level.

12. The method of claim 9, wherein determining that the at least one sub-band of the transformed downlink signal includes the data to be transmitted comprises:
receiving a control signal from a base station;
identifying, from the control signal, at least one channel used by the base station to transmit downlink signals; and
identifying the at least one sub-band from the at least one identified channel.

13. The method of claim 9, further comprising:
discarding the additional data for the at least one additional portion by excluding the additional data from a combining operation used to route the data for the at least one portion to the at least one remote antenna unit.

14. The method of claim 9, further comprising:
determining that at least one additional sub-band lacks data to be transmitted via the distributed antenna system;
modifying the transformed downlink signal to exclude the at least one additional sub-band; and
reducing a sampling rate of the transformed downlink signal based on the transformed downlink signal being modified to exclude the at least one additional sub-band.

15. The method of claim 9, further comprising:
receiving a plurality of transformed uplink signals from a plurality of remote antenna units of the distributed antenna system, wherein each of the plurality of transformed uplink signals is generated by performing an additional frequency transform on a respective uplink signal to represent the respective uplink signal in the frequency domain;
identifying a subset of sub-bands from the plurality of transformed uplink signals that include uplink data to be transmitted via the distributed antenna system; and
combining the subset of sub-bands for transmission to a base station, wherein a combining operation performed by the unit excludes sub-bands other than the subset of sub-bands that include the uplink data.

16. The method of claim 9, wherein the at least a portion of the transformed downlink signal includes at least one bin.

17. A system comprising:
a first unit configured to:
receive a downlink signal;
sub-divide the downlink signal into a sub-divided downlink signal having downlink signal components in a time domain, each of the downlink signal components corresponding to a respective sub-band;
determine that at least one component of the downlink signal components corresponds to at least one sub-band having data to be transmitted via the distributed antenna system;
generate a transformed downlink signal representing the downlink signal in a frequency domain by performing a frequency transform on the downlink signal;
determine that the at least one sub-band of the transformed downlink signal includes the data to be transmitted;
extract the at least one sub-band from the transformed downlink signal at least in part by being configured to provide data for at least one portion of the transformed downlink signal in the frequency domain that corresponds to the at least one sub-band to a second unit of the system; and
the second unit configured to:
receive the at least one sub-band extracted from the transformed downlink signal from the first unit;
generate a radio frequency signal based on the at least one sub-band, and
transmit the radio frequency signal to a terminal device.

18. The system of claim 17, wherein the first unit is configured to perform the frequency transform by executing at least one of a fast Fourier transform algorithm, a discrete Fourier transform algorithm, and a discrete cosine transform algorithm using the downlink signal as an input.

19. The system of claim 17, wherein the first unit is configured to determine that the at least one sub-band of the transformed downlink signal includes the data to be transmitted by being configured to:
   identify a respective signal level for each of the portions of the transformed downlink signal in the frequency domain; and
   determine that at least one of the plurality of portions that corresponds to the at least one sub-band has a signal level exceeding a threshold signal level.

20. The system of claim 17, wherein the at least one portion of the transformed downlink signal includes at least one bin.

* * * * *